US010402193B2

(12) United States Patent
Boss et al.

(10) Patent No.: US 10,402,193 B2
(45) Date of Patent: *Sep. 3, 2019

(54) PROVIDING CUSTOMIZED AND TARGETED PERFORMANCE IMPROVEMENT RECOMMENDATIONS FOR SOFTWARE DEVELOPMENT TEAMS

(71) Applicant: International Business Machines Corporation, Armonk, NY (US)

(72) Inventors: Gregory J. Boss, Saginaw, MI (US); Nikolay Kadochnikov, Batavia, IL (US); Peter P. Bradford, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/843,018

(22) Filed: Dec. 15, 2017

(65) Prior Publication Data
US 2019/0012167 A1 Jan. 10, 2019

Related U.S. Application Data

(63) Continuation of application No. 15/641,956, filed on Jul. 5, 2017.

(51) Int. Cl.
*G06F 9/44* (2018.01)
*G06F 17/00* (2019.01)
(Continued)

(52) U.S. Cl.
CPC ............... *G06F 8/70* (2013.01); *G06N 20/00* (2019.01); *G06Q 50/01* (2013.01); *G06F 11/34* (2013.01);
(Continued)

(58) Field of Classification Search
CPC .. G06Q 10/06398; G06Q 10/06; G06Q 10/10; G06Q 10/063; G06Q 10/063114; G06F 17/50; G06F 17/30607; G06F 11/34
See application file for complete search history.

(56) References Cited

U.S. PATENT DOCUMENTS 5,208,765 A * 5/1993 Turnbull ................ G06Q 10/06
702/84
5,367,473 A * 11/1994 Chu ........................ G06F 11/34
702/186
(Continued)

OTHER PUBLICATIONS

Michelle A. Marks et al., A Temporally Based Framework and Taxonomy of Team Processes, 2001, [Retrieved on Apr. 19, 2019]. Retrieved from the internet: <URL: https://www.jstor.org/stable/pdf/259182.pdf> 22 Pages (356-376) (Year: 2001).*

(Continued)

*Primary Examiner* — Anibal Rivera
(74) *Attorney, Agent, or Firm* — Scully, Scott, Murphy & Presser, P.C.; Nicholas Bowman, Esq.

(57) ABSTRACT

A cognitive system, method and computer program product for maximizing a productivity of software development by a software development team. The system and method implement cognitive processes for determining what certain organizational factors and their optimal values which correspond to high performing software development teams. Based on the determinations correlating organization factors with productivity increases, the system prescribes what Key Performance Indicators (KPIs) to improve (e.g., increase and decrease), and determine what are the target improvement values. Use of the systems and methods described herein enable development managers and executives to build maximum performance teams (or transform existing teams, boosting their productivity), by leveraging customized quantitative recommendation provided as output. The system and (Continued)

method overcomes inefficiency of existing measures by enabling global and automated ways of maximizing the development productivity by continuously providing customized and targeted performance improvement.

8 Claims, 7 Drawing Sheets

(51) Int. Cl.
*G06Q 10/00* (2012.01)
*G06F 8/70* (2018.01)
*G06Q 50/00* (2012.01)
*G06N 20/00* (2019.01)
*G06Q 10/06* (2012.01)
*G06F 11/34* (2006.01)

(52) U.S. Cl.
CPC ....... *G06Q 10/06* (2013.01); *G06Q 10/06398* (2013.01)

(56) References Cited

U.S. PATENT DOCUMENTS

| | | | | |
|---|---|---|---|---|
| 5,548,506 A * | 8/1996 | Srinivasan | ..... | G06Q 10/063114 705/7.15 |
| 5,675,745 A * | 10/1997 | Oku | ........ | G06Q 10/06 705/7.11 |
| 5,737,727 A * | 4/1998 | Lehmann | ............... | G06Q 10/06 705/7.13 |
| 5,761,063 A * | 6/1998 | Jannette | .................. | G06F 17/50 700/97 |
| 5,771,179 A * | 6/1998 | White | .................... | G01R 31/00 702/183 |
| 5,812,049 A * | 9/1998 | Uzi | .......................... | G07C 1/24 340/323 R |
| 5,960,173 A * | 9/1999 | Tang | ......................... | G06F 9/54 348/14.08 |
| 6,036,345 A * | 3/2000 | Jannette | .................. | G06F 17/50 700/97 |
| 6,295,513 B1 * | 9/2001 | Thackston | ......... | G05B 19/4099 703/1 |
| 6,349,327 B1 * | 2/2002 | Tang | ......................... | G06F 8/38 709/201 |
| 6,678,671 B1 * | 1/2004 | Petrovic | ................. | G06Q 10/06 |
| 6,889,196 B1 * | 5/2005 | Clark | ................ | G06Q 10/0631 705/7.12 |
| 7,082,404 B2 * | 7/2006 | Calderaro | .............. | G06Q 10/10 705/7.42 |
| 7,212,986 B1 * | 5/2007 | Richardson | ........ | G06Q 10/0631 705/7.18 |
| 8,554,597 B2 | 10/2013 | Allpress et al. | | |
| 8,775,332 B1 | 7/2014 | Morris et al. | | |
| 2005/0114829 A1 * | 5/2005 | Robin | .................... | G06Q 10/06 717/101 |
| 2007/0208588 A1 | 9/2007 | Rhoades et al. | | |
| 2007/0260735 A1 | 11/2007 | Olsson et al. | | |
| 2008/0005235 A1 * | 1/2008 | Hegde | .................... | G06Q 10/10 709/204 |
| 2009/0043621 A1 * | 2/2009 | Kershaw | ................ | G06Q 10/06 705/7.16 |
| 2009/0047643 A1 * | 2/2009 | Isaac | ..................... | G09B 19/00 434/237 |
| 2010/0305994 A1 | 12/2010 | Gaskell | | |
| 2012/0130757 A1 * | 5/2012 | Khosla | ................ | G06Q 10/063 705/7.11 |
| 2016/0260044 A1 * | 9/2016 | Sabet | ............... | G06Q 10/06398 |

OTHER PUBLICATIONS

Jon R. Katzenbach et al., The Discipline of Teams, Jul.-Aug. 2005, [Retrieved on Apr. 19, 2019]. Retrieved from the internet: <URL: http://delivery.acm.org/10.1145/2240000/2232005/p1427-balduzzi.pdf?> 12 Pages (1-11) (Year: 2005).*

John J. Sung, Representation-Oriented Software Development: A cognitive approach to software engineering, Jun. 2005, [Retrieved on Apr. 19, 2019]. Retrieved from the internet: <URL: http://www.ppig.org/sites/default/files/2005-PPIG-17th-sung.pdf> 15 Pages (173-187) (Year: 2005).*

Boehm et al., "Software Cost Estimation with Cocomo II with Cdrom", BOOK 2000, Prentice Hall PTR Upper Saddle River, NJ @2000, ISBN: 0130266922, abstract only.

Jones et al., "The Economics of Software Quality", BOOK 2011, Addison-Wesley Professional @2011, ISBN: 0132582201 9780132582209, abstract only.

Putnam et al., "Measures for Excellence: Reliable Software on Time, within Budget", BOOK 1991, Prentice Hall Professional Technical Reference @1991, abstract only.

List of IBM Patents or Patent Applications Treated as Related.

U.S. non-Final Office Action dated Sep. 6, 2018 in related U.S. Appl. No. 15/641,956.

Marks et al. "A Temporally Based Framework and Taxonomy of Team Processes", Academy of Management Review, 2001, [Retrieved on Feb. 5, 2019] Retrieved from the Internet: <URL: https//www.jstor.org/stable/pdf/259182.pdf> 22 Pages (356-376) (Year: 2001) Jul. 2001.

Katzenbach et al., "The Discipline of Teams" Jul.-Aug. 2005, [Retrieved on Feb. 5, 2019], Retrieved from the Internet, <URL: http://delivery.acm.org/10.1145/2240000/223005/p1427-balduzzi.pdf?> 12 Pages (1-11) (Yesr: 2005).

Notice of Allowance dated Feb. 8, 2019 in a related U.S. Appl. No. 15/641,956.

* cited by examiner

| ACTION | KPI NAME | TARGET |
|---|---|---|
| ⇑ | PATENTS | 20% INCREASE IN PATENTS |
| ⇒ | ATTRITION | 50% ATTRITION REDUCTION |
| ⇑ | COLLOCATION | 10% INCREASE IN EMPLOYEE COLLOCATION |
| ⇑ | SENIORITY DISTRIBUTION | 40% INCREASE IN JUNIOR RESOURCES |
| ⇒ | COST / COMPENSATION | 5% REDUCTION IN COST OF DEVELOPMENT RESOURCES |

FIG. 5

PROVIDING CUSTOMIZED AND TARGETED PERFORMANCE IMPROVEMENT RECOMMENDATIONS FOR SOFTWARE DEVELOPMENT TEAMS

BACKGROUND

The present invention generally relates to systems and methods for maximizing the productivity of software development teams comprising plural individuals.

Management does not have common methods for measuring development productivity. There are no accepted common metrics between teams, projects and locations. A company's development investment decisions typically are not aligned with development activities.

While it is generally observed that productive teams do more, deliver faster, operate cheaper and create products with higher quality, it is not obvious what organizational factors and optimal values correspond to these high performing teams.

BRIEF SUMMARY

The present invention describes a system, method and computer program product to process both structured and unstructured team data relating to members development activities and recommend what attributes managers need to change in order to optimize the development teams output.

In one embodiment, there is provided a system, method and computer program product to for maximizing the productivity of a software development team by prescribing what Key Performance Indicators (KPIs) to improve (i.e., increase and decrease) and what are the target improvement values.

In one embodiment, there is provided a computer-implemented method for improving the effectiveness and efficiency of software development operations. The method comprises: for each of a plurality of teams, receiving, at a hardware processor, activities data representing each team member's productivity relating to a product currently being developed; and receiving, at the hardware processor, further activities data relating to each team member's collaborative interactions; and performing, at the hardware processor, a cognitive classification of the activities for each of members of each team, and aggregating classifications of team members of each team to generate a respective individual team profile; generating, at the hardware processor, a respective productivity index function representing desired performance objectives for the team; and inputting, using the hardware processor, an individual team profile data and corresponding team productivity function index data to a model trained to correlate the individual team profile to learned positive attributes associated with a most productive development team of the plurality of teams; and generating, using the trained model, an output recommending which performance attributes of an individual team can be improved based on the model's correlating that team's data with the learned positive predicting attributes for increasing productivity of that team.

Other embodiments include a computer program product and a system.

BRIEF DESCRIPTION OF THE SEVERAL VIEWS OF THE DRAWINGS

The details of the present disclosure, both as to its structure and operation, can best be understood by referring to the accompanying drawings, in which like reference numbers and designations refer to like elements.

FIG. 5 provides an example of a recommendation displayed via a system interface in the form of a table or chart that provides data-driven actionable recommendations for each team's scenario to help improve that team's productivity;

DETAILED DESCRIPTION

There is provided a Cognitive Software Development Optimization System (CSDOS) that enables decision makers to make informed investment decisions based on the right type of development activity that is aligned with product lifecycle and financial goals.

Figure 1:
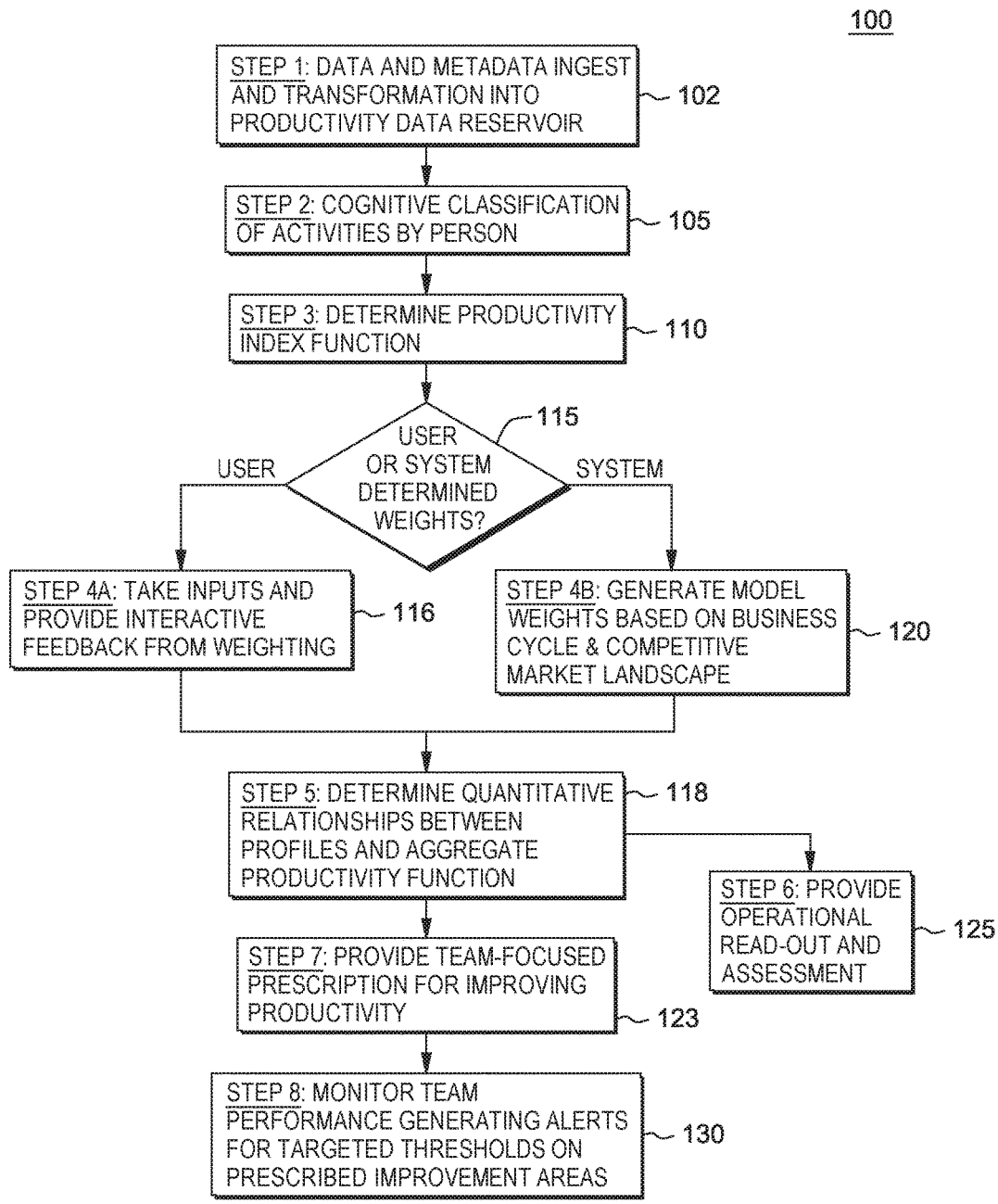
FIG. 1 illustrates a flow chart of a method employed according to one embodiment of the present invention.

FIG. 1 depicts a method 100 in one embodiment for improving productivity of software development teams. From the method, it may be ascertained which person/team of persons are effective in what they do, e.g., develop software code. For example, while one metric for rating a software developer is obtained by a number of "source lines of code" (SLOC) measurement, e.g., how many source lines of code (SLOC) did that developer generate, this is not an accurate metric. That is, the more SLOCs for that developer, does not necessarily make that employee "better" or more productive. For example, SLOC measurement approach results in tremendously bloated code, as developers will tend to program more code. Other types of measurements may conflict with the SLOCs concept such as evaluating a developer based on any generated algorithms or like innovations of a program code that takes up less lines of code and less CPU processing time. That is, in the time one developer may produce many lines of code to accomplish a task, another developer may spend the same amount of time generating and programming an algorithm which accomplishes the same thing in less lines of code.

Such a metric of drafting an algorithm to save code and CPU processing is difficult to apply across the board, as the difficulty and complexity of code changes amongst the development teams, e.g., a simple web-application based service programming may be less demanding than devising machine code to run a CPU which requires a developer having greater skill. Thus, due to those functions, it is difficult to evaluate different teams and identify how to increase productivity of such teams.

In one embodiment, a tool is provided that evaluates a team developing code and/or applications and assesses the overall cognitive state of the developers. That is, the system monitors the surrounding activities or aspects of the software developers. Such aspects being monitored may include, but are not limited to: developer's interactions with others in the development process. It recognizes people's roles in the system, e.g., UI designer or a developer. After recognizing the user's role in the system, the system monitors the work they perform (e.g., written code), their actions taken in creating functionalities, and their interaction with others. From this data, the tool generates recommendations for improving productivity from the developers/users, in the aggregate, of a software development team.

In one aspect, the tool functions as a decision support system, enabling global and automated ways of maximizing the development productivity by providing customized and targeted performance improvement recommendations for software development teams.

Figure 3:
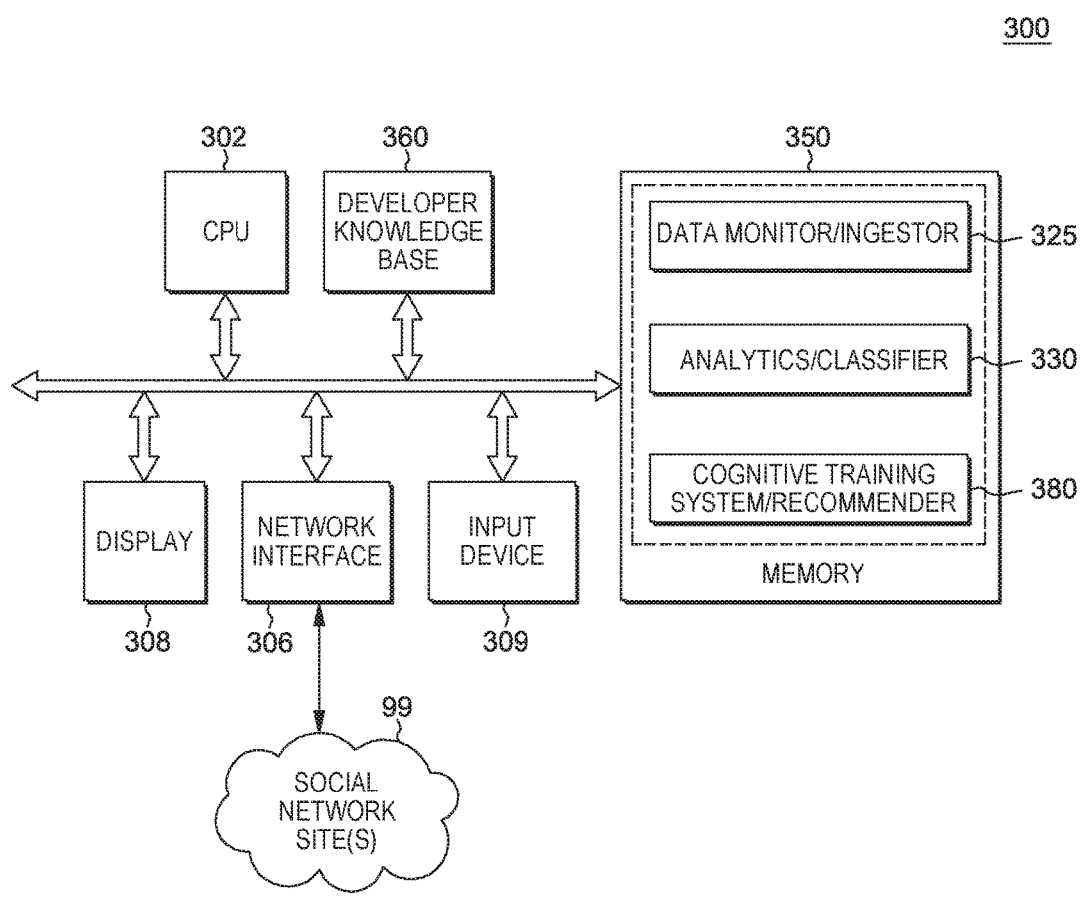
FIG. 3 schematically shows an exemplary computer system/mobile device which is applicable to implement the embodiments of the present invention.

In one embodiment, FIG. 3 shows an example tool 300 embodied as a computer system that implements methods to generate and apply a learned productivity model that can be used to make a recommendation to any entity for increasing productivity of a product development team. In one example implementation described herein, a development team is to develop a software product, however, it is understood that the tool and methods described may be applicable for optimizing productivity of developers of any product. In one embodiment, methods implemented at system 300 are provided that process unstructured developer team data and structured product-related data, and recommend what attributes managers need to change in order to optimize the development team's output. These attributes are also referred to herein as Key Performance Indicators (KPIs).

In one embodiment, a computing system 300 implements or accesses machine learning algorithms available from International Business Machines, Corp. (IBM TJ Watson Research Center Yorktown Heights, N.Y.).

Referring now to FIG. 3, computer system 300 provides a cognitive ability for recommending ways for any entity to increasing productivity of a software or other product development team. In some aspects, system 300 may include a computing device, a mobile device, or a server. In some aspects, computing device 300 may include, for example, personal computers, laptops, tablets, smart devices, smart phones, smart wearable devices, smart watches, or any other similar computing device.

Computing system 300 includes at least a processor 302, a memory 304, e.g., for storing an operating system and program instructions, a network interface 306, a display device 308, an input device 309, and any other features common to a computing device. In some aspects, computing system 300 may, for example, be any computing device that is configured to communicate with a social media web-site 320 or web- or cloud-based server (not shown) over a public or private communications network 99.

In one embodiment, as shown in FIG. 3, a device memory 350 stores program modules providing the system with cognitive abilities for suggesting ways to improve a development team's KPIs. One program module 325 includes a data monitor/ingestor program 325 providing ability to monitor and receive developers' updated profile, personal, social and financial information such as is stored in the productivity reservoir 250.

A further program module 330 provides analytics to classify a developer's activity. Such a module 330 provides for a cognitive classification of a developer. In one embodiment, the module may implement or access a cognitive system, e.g., IBM's Watson® Natural Language Classifier and IBM's Watson® Explorer, or like, cognitive search and content analysis platform that may be leveraged to understand the detailed nature of the work each team member performs. In one embodiment, cognitive algorithms are applied to social data, human resources (HR) data and source code management data to determine exact activities performed by person, such as development, testing, product management, support, operations, etc. In one embodiment, this information may be combined with other data to obtain a detailed understanding of how each developer(s) is(are) spending their time on each task and activity.

In FIG. 3, processor 302 may include, for example, a microcontroller, Field Programmable Gate Array (FPGA), or any other processor that is configured to perform various operations. Processor 302 may be configured to execute instructions as described below. These instructions may be stored, for example, in memory 350.

Memory 350 may include, for example, non-transitory computer readable media in the form of volatile memory, such as random access memory (RAM) and/or cache memory or others. Memory 350 may include, for example, other removable/non-removable, volatile/non-volatile storage media. By way of non-limiting examples only, memory 350 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 306 is configured to transmit and receive data or information to and from a collaborative or social media web-site server (not shown), e.g., via wired or wireless connections. For example, network interface 306 may utilize wireless technologies and communication protocols such as Bluetooth®, WWI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 300 to transmit information to or receive information from another server (not shown).

Display 308 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 308 may include a liquid crystal display (LCD), an e-paper/e-ink display, an organic LED (OLED) display, or other similar display technologies. In some aspects, display 308 may be touch-sensitive and may also function as an input device.

Input device 309 may include, for example, a keyboard, a mouse, a touch-sensitive display, a keypad, a microphone, or other similar input devices or any other input devices that may be used alone or together to provide a user with the capability to interact with the computing device 300.

With respect to the cognitive ability of computer system 300 for making performance attribute recommendation to increase a team's productivity, the system 300 includes: a knowledge base 360 configured for storing past (historical) interactions data, activities data and personal productivity data for a particular developer relating to software development. Besides correlating users interactions and activities with individual productivity and in the aggregate, team productivity, further correlations are made over time responsive to other or new user activities.

In one embodiment, a cognitive training system/recommender program module 380 is stored in memory 350 and implements a model training algorithm that builds the knowledgebase 360 based on developer(s) activities and personal productivity, and product performance/financials over time. The model aggregates data for all developer's of specific development teams as will be described with respect to the method of FIG. 1.

In one embodiment, the cognitive training system/recommender module 350 runs methods for training productivity model and making recommendations for improving team productivity based on the accumulated knowledge in knowledgebase 360. In one embodiment, this knowledgebase 360 may be local to the computer or mobile device system 300, or otherwise, such knowledgebase 360 may be located on a server, in a network, e.g., a cloud.

For example, the developer's various personal data, financial data, collaboration information, etc. collected by the various systems and stored in the productivity reservoir 250 for the individual developers of the development team, may be received as input to a computing device implementing the machine algorithms to analyze the data and apply the trained productivity model.

Based on the input data, the trained system/recommender module 350 takes the KPIs and builds the model that determines which of those KPI would be most predictive and/or important to address to increase productivity. The model learns, over time, which input parameters have the most improved effect on the output parameters for a particular productivity. The machine learning algorithms implemented in the model provides a set of predictive and descriptive data elements at a predetermined confidence level.

In one aspect, the tool 300 runs a method 100 such as described with respect to FIG. 1. As shown at a first step 102, FIG. 1, the method continually ingests data and metadata for the tool, and transforms the ingested data/metadata into a productivity data reservoir which may form the developer knowledgebase 360.

Figure 2:
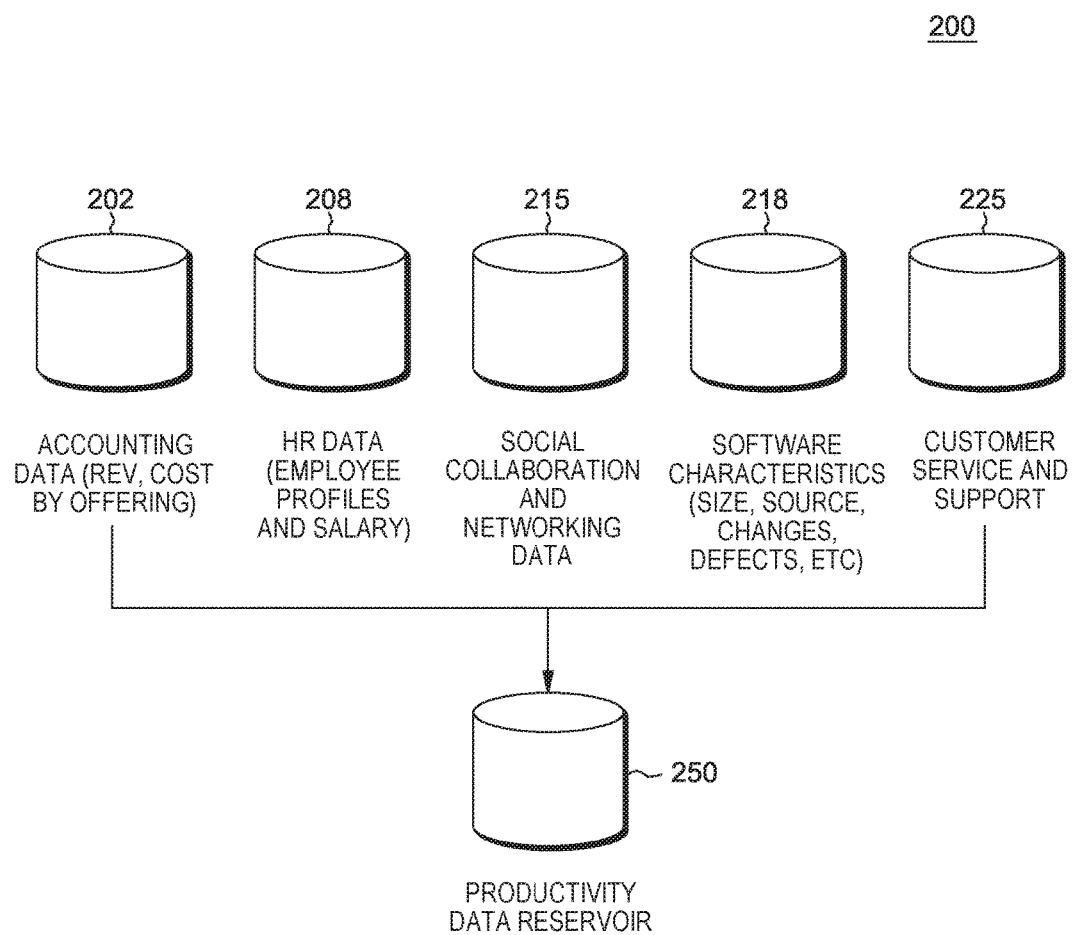
FIG. 2 conceptually depicts the key data types for ingestion and storage in a productivity data reservoir according to one embodiment.

FIG. 2 shows a linking of the various data sources 200 providing data and metadata for the tool to ingest and provide recommendations for improving productivity from the developers of the software development team. The data sources provide structured and unstructured data/metadata that is input and stored in a storage device, i.e., a productivity data reservoir 250. In one embodiment, the data/metadata is stored in the form of one or more productivity matrices (not shown) in the productivity data reservoir 250. More specifically, the productivity data reservoir is created by ingesting and transforming data and metadata for key product performance metrics across the company or like entity.

In one embodiment, data sources 200 that provide productivity and other data for the system to evaluate include, but are not limited to: accounting data 202 such as revenue, amount of sales, costs per software product offerings, for example, that is made available from a financial system; human resources data 208 including employee profiles and salary; social collaboration and networking data 215; software characteristics 218, e.g., the size, source, the presence and/or amount of changes, the presence and/or amount of defects, etc.; and further, customer service and support data 225 relating to that software being developed.

Thus, for example, ingested accounting data 202 received from a financial system may include product financial information, e.g., product availability, pricing information, sales information and information such as revenue, profitability, growth, etc. regarding the software developed by a developer of the team being evaluated. For example, it may be determined the software being developed does not sell.

Human resources data 208 may include data regarding a developer's salary. For example, a first developer may be deemed an effective developer and make a low salary, while a second developer that is twice as effective may receive a ten times greater salary, which would mean the first developer may be more effective per unit of money. Moreover, there may be obtained from an entity's human resources department further developer information, including: their position, title, and the product they are developing, attrition, salaries, tenure, etc.

The stored social collaboration and networking data 215 is obtained over a network from social media web-sites, blogs, wiki's, Slack® (Registered Trademark of Slack Technologies, Inc.), Mural.ly® (Registered Trademark of Tactivos, Inc.), etc. and includes user's postings and/or data representing interactions of the developer with others whether it be managers, colleagues, and/or friends.

The stored software characteristics data 218 may be obtained from software and source code management systems (not shown) and may include, but is not limited to: data relating to the developer's contributions: e.g., number of lines of code, number of defects in the code, code complexity, code submission frequency, etc. The system holistically monitors and records data for each of the iterations/versions of the software code in development.

The customer software data 225 may be received from a customer service and support system and relates to information service and support activities for the software in use and/or being developed. For example, from customer support systems, there may be received data relating to customer problems reported, patches downloaded, etc.

Retuning to FIG. 1, at 105, there are performed methods to cognitively analyze and classify activities by a team member(s) of the development team being evaluated. The cognitive classification enables users to create and understand cognitively, i.e., in detail, what each team member has done. In one embodiment, the system tracks on a periodic basis, e.g., daily, the activities (work) relating to the team member (developer), for example, relating to the code that was checked in by the team member, and how that user interacted and/or communicated, e.g., what was communicated (socially or collaboratively), in the context of development activities, e.g., in a social collaboration network or system, with colleagues while developing code. Such data may be considered unstructured, arrive from varying sources in no defined format, and may include text, speech, or other audio or video format.

In one embodiment, at 105, the system may initially perform a cognitive classification of activities for each team member, and define a job role for each team member using real-time and/or historical data. In one embodiment, the system may recognize the development roles of each employee based on routine interactions and will perform even if the development job role descriptions are very generic (e.g., Software Engineer) or spurious (e.g., "Code Warrior").

The interaction data and developer's activities, obtained at step 105, FIG. 1, may be combined to make various determinations relating to the developer and that developer's team. For example, the analysis methods determine how a developer's day(s) is(are) spent, e.g., whether/when and how often new code was checked in, whether a developer was chatting with colleagues all day, or was given free coffee or tea, etc. This determination may be combined with other data obtained from the productivity reservoir or repository 250. For example, the developer's delivery of code may be combined with that developer's financial and other personal information and/or product financial information, e.g., revenue, and used to classify the developer's productivity. There is a trade-off between various activities the developer can be engaged in. For example, a developer who does nothing else during the day but generate lines of code would have one classification or role assigned, while a developer that develops efficient algorithms that reduces lines of code yet takes a lot of daily work breaks and/or is more interactive or collaborative may be assigned a different role or classification.

Figure 6:
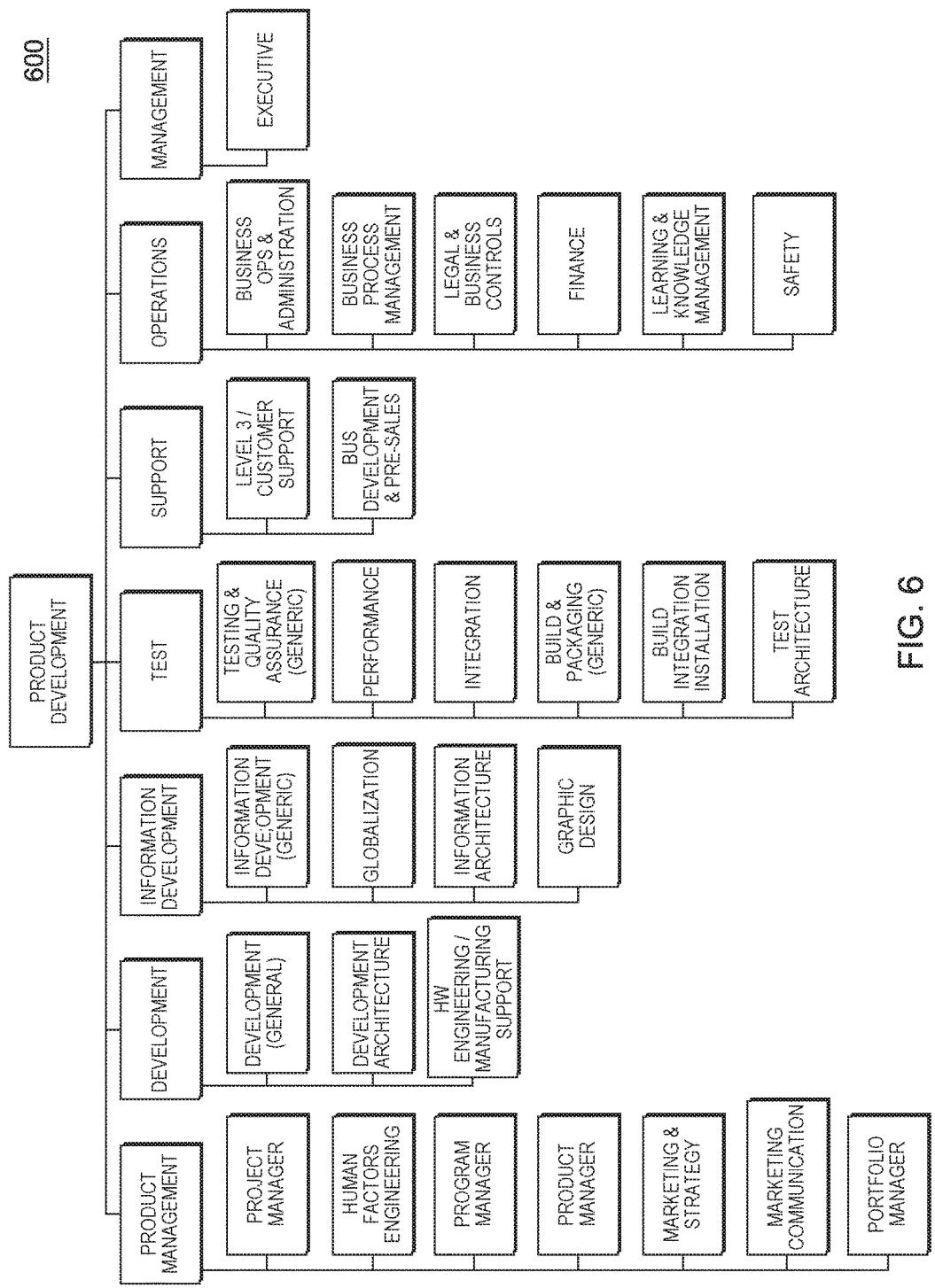
FIG. 6 depicts an example product development organizational chart within which various members' productivity may be classified.

It is understood that productivity of the organization is the product of many roles. FIG. 6 depicts an example product development organizational chart 600 (e.g., for software product) showing a hierarchy of a software development organization within which various members' productivity may be classified at step 105. For example, the development of a product may encompass various regimes including, but not limited to: product management, development, information development, test, support, operations, and management. For example, under a product management regime, members of the team may include, but are not limited to: project managers, program managers, human factors engineering, product managers, marketers, and other management roles. Each of the roles (member) in each regime will be assessed based on their own mission, associated inputs, and work products (i.e. outputs). For example: under the test regime, testers may work through test cases, regression buckets, etc. One of their key "products" is not lines of code, but identified "defects" which will impact the target customers. It may be considered "non-productive" when these individuals: a) identify code defects that will never be found/experienced by customers, b) don't find defects because test cases don't match customer use profiles, c) find defects, but require highly manual, resource intensive, or redundant efforts.

In one embodiment, at step 105, FIG. 1, the team member activities around a primary job classification (e.g., data in systems of engagement or systems of insight) are used to help establish a more granular taxonomy, sometimes counter to what systems of record initially present for an individual.

At step 110, FIG. 1, the combined developer activity data that is generated based on the structured and unstructured data found in productivity data reservoir 250 is analyzed and a productivity index function is generated. That is, based on the cognitive classification of the activities of each developer from the team, the process proceeds to 110 to compute a productivity index function. In one embodiment, this productivity index function represents what an entity, e.g., a team manager, is desirous to get out of the product being developed, e.g., increased revenue growth, improved margin, increased sales, or any other objective or goal.

In one embodiment, the productivity index function is a composite measure of a desired performance based on the combination of revenue, profitability and growth and may be generated using a tool such as IBM's Watson® Tradeoff Analytics program that enables decision making when balancing multiple objectives. That is, the Watson® Tradeoff Analytics program may be used to identify the best recommendation for any given development team while considering multiple objectives/factors.

Continuing from 110, FIG. 1, at 115, a determination is made as to whether specific system determined weights or user determined weights for use in developing a productivity model that can be used to determine recommendations for increasing a development team's productivity (in the aggregate). In one embodiment, a user-specified or system-specified weight(s) represents a priority set for a particular business objective(s) or business parameter(s) of a product being developed by the development team.

If, at 115, it is determined that system determined weights are to be used, then the process proceeds to step 120 where model weights are automatically generated for input to the machine learning algorithms employed based on the current business cycle and competitive market landscape. In one embodiment, the system generates default model weights based on the analysis of structured and unstructured data items obtained from the reservoir 250, the cognitive analysis performed for classifying the activities, and the current business cycle and competitive offering performance. That is, without setting a parameter goal, the system will implement machine learning algorithms that automatically learn from how the product performed over a past time period (e.g., from operations, revenues, product financials, etc.), and make the best recommendations for the development team the economic environment, market landscape and market conditions, etc. That is, using a learning model based on linear modeling function and applied across all parameters, and given the prior product behavior and product financials, the model learns what would be the best goal(s) and optimal levels to achieve.

Otherwise, at 115, if it is determined that user determined weights are to be used, the process proceeds to step 116 that involves further steps of receiving/taking user inputs and providing interactive feedback from the weighting. In one example implementation, interactive feedback is enabled via an input device, in which a user may provide a priority for given business parameter.

For example, a product manager of a software development entity may set a bias to achieve a particular goal and, through a device interface, may input and set parameters relating to a product performance goal for a product in the market place. For example, one product may be old and generate moderate income, but has steady sales, while a second product is up and coming but is presently losing money for the entity. In this example, a user can bias and give more weight to parameters like market share growth or brand perception that bias productivity measurements toward a new market.

In one embodiment, a user, via an interface to the system described herein with respect to FIG. 3, may input desirous objective(s), e.g., maximize revenue or grow revenue by 5% points over next 12 months, and assign it a higher weight. In one embodiment, example KPI's may be listed and objective function parameters that may be user-selected.

Whether weights are to be generated by the system at 120 or, by the user at 116, the method proceeds to 118 to implement machine learning techniques for determining one or more quantitative relationships between developers' profiles and an aggregate productivity function for each of the teams.

In one embodiment, given the current and historical data that has been collected from the systems that measure user's behavior and personal productivity and/or product performance, a computer run model is generated that is configured to find which team(s) were most productive, and indicate which attributes (i.e., performance indicators) had the most impact upon the most productive team. In one embodiment, machine learning algorithms (such as multivariate linear models) are trained to establish quantitative relationships between the profiles of most effective development team (data derived from steps 102 and 105) and desired performance objectives (based on the model weights data input by the user at step 116 or determined at 120, FIG. 1). Support vector machines, multilinear models and regression based models can alternatively be trained and applied at step 118 to produce similar results based on the developers' personal and productivity data relating to the product and software product financial data received.

Based on this learning, management systems can determine a profile of the most productive "team", i.e., what common characteristics do the team developers have. For example, from the collected data, it may be determined that developers of the team having attributes including being located in close proximity and meet regularly at one location on frequent basis, have low attrition rate, and are a little more highly paid, were more productive and rated very high or were all given free coffee. As another example, it may be determined that a team having similar personal/salary attributes, however, were physically located in different countries and collaborated infrequently may be less effective.

The parameters learned from the most successful team, may be used as recommendations of other teams, e.g., those that are less productive. For example, a less productive team may be encouraged to have its developers' co-locate, i.e., move and work in a single location, and foster more collaborative interactions. Thus, the tool would generate profile attributes as recommendations (KPIs) to encourage co-location or movement of developer's team members to a single location, decrease attrition rate, increase salary, etc. which profile attributes are known as significant predictors that may positively impact the developer productivity.

Returning to 118, FIG. 1, having determined the quantitative relationships between developers' profiles and aggregate productivity function, in one embodiment, the method continues to 125, where, based on the determined quantitative relationships between developers' profiles and aggregate productivity function, the method provides operational read-out and assessment. In one embodiment, the system leverages reporting dashboards to provide a visual display of an overall productivity index with recommended improvement areas for the development team.

Figure 4:
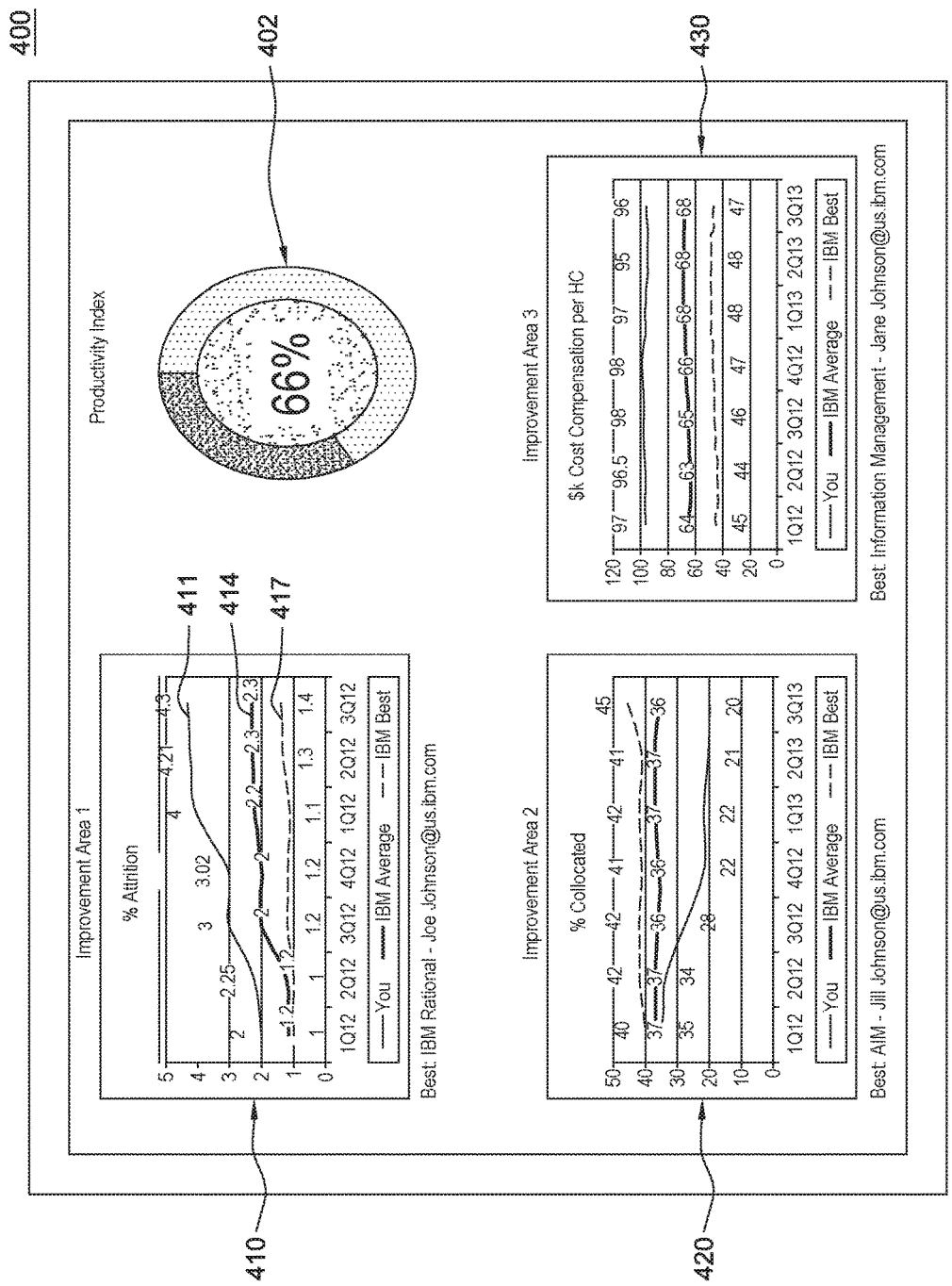
FIG. 4 shows an example dashboard display depicting an operational read-out of a productivity index with example top three improvement areas, in an example embodiment.

FIG. 4 shows an example dashboard display 400 providing an operational read-out of productivity index 402 for a particular individual or team, with an indication of example top improvement areas, 410, 420, 430. The dashboard 400, in one embodiment, depicts an operational or benchmarking type approach by indicating comparisons of particular KPI attributes for a developer's team with other teams having average and more productive levels. In particular, data from the outputs of the model algorithms are formatted for display as shown in example dashboard 400 to provide visualizations for example KPI attributes 410 ("Attrition %" attrition rate attribute), 420 ("% Collocated" attribute), and 430 ("$k Cost Compensation per HC" or salary attribute). For example, from the dashboard 400 of FIG. 4, there is depicted for each improvement area 410-430, a developer's team's performance over a historical time period plotted against other teams that may have a similar composition, e.g., an average performing development team or compared against the best performing team. Via the dashboard, a user can track the performance for the displayed KPIs attributes over time can further show whether one individual or team's performance indicator goals have been met. Thus, for first example improvement area 410 (business objective parameter is "percent attrition"), there is shown a developer's team's performance over a historical time period 411, and showing their performance as compared to a performance 414 averaged across many development teams, and further differentiated against the best performing team 417.

The visualization provided via dashboard 400 provides a team-focused prescription for improving productivity. In one embodiment, customized performance improvement recommendations are generated by applying the machine learning models from step 118, FIG. 1, based on the data from steps 102, 105 and 110 to identify which performance changes would provide the maximum impact for a given team, based on the team's profile and the development objectives (according to specified user or system-determined weights). In one embodiment, these prescriptive improvements and levels are tailored based on marginal team benefits by indicator to enable the highest productivity per unit investment.

Returning to 118, FIG. 1, having determined the quantitative relationships between developers' profiles and aggregate productivity function, the method may also proceed to step 123, FIG. 1, to provide a team-focused prescription or recommendation for improving productivity. That is, by running the generated machine-learning model on the data, there is generated an output indicating which performance attributes of that team can be improved based on the model's correlating that team's data with the learned positive predicting attributes for increasing productivity.

FIG. 5 provides an example of a recommendation displayed via a system interface in the form of a table or chart 500 that provides data-driven actionable recommendations for each team's scenario to improve that team's productivity. The tool's machine learning algorithms learns which variables (parameters) are important and learns what are the optimal parameters to achieve. The recommender module generates output data that is transformed into a set of recommendations in a form that can be presented to a user.

FIG. 5 shows an example set of recommendations generated by the recommender module 380 as a result of monitoring knowledgebase data. One example set of recommendations that may be generated by the system 300 for increasing productivity of a software development team is shown in table form. In one example table depicted, the recommendation consist of five steps, presented in order of priority: increase the number of patents filed (target: 20% increase in patents filed); reduce employee attrition (target: 50% reduction in attrition); improve employee collocation (target: increase team collocation by 10%); redistribute team seniority (target: 40% increase in junior resources, while keeping the ratio of senior and mid-career employees); and reduce the cost of development resources (target: 5% reduction in overall cost/compensation).

The system may be programmed to automatically generate for managers and executives of the development teams customized and regularly updated recommendations via the dashboard on how to increase productivity of their teams. In the example as shown in table 500, a first column 506 represents Actions to take, whether to increase or decrease a value of a corresponding performance goal. A second column 503 representing particular KPI's, that is, the particular attributes determined to impact a team's productivity. A third column 509 represents the corresponding Target goal for the particular attribute. Thus, for example, on recommendation 510 may be to increase the number of more junior members in the team, which may/may not requires a concurrent decrease in the number of senior team members (a senior distribution KPI attribute). Concurrently, there may be recommended for the team to decrease its overall cost of development resources as indicated for example recommendation 520.

Continuing to step 130, FIG. 1, the tool then implements methods for continuous monitoring team performance over time, and generating alerts for targeted thresholds on prescribed improvement areas. In one embodiment, cognitive algorithms are continuously monitoring which recommendations had been implemented and how their implementation had affected the product marketplace performance (e.g., as captured in step 110, FIG. 1). Recommendations are adjusted as additional information is collected or as recommended changes are implemented.

In on embodiment, in the computing system of FIG. 3, multivariate linear machine learning algorithms are implemented and the model is continuously updated and trained with most positive outcomes to correlate and learn and recognize the most important attributes (parameters) that most positively increases team productivity. These positive predicting attributes are alternatively referred to as key performance indicators (KPI) and may change over time. Consequently, the recommendations (KPI's) and their target values such as shown in recommendation table 500 of FIG. 5, may be change over time.

In one embodiment, FIG. 5 shows a system for implementing the methods herein for recommending KPI's to improve team productivity. Managers and executives of the development team may receive customized and regularly updated recommendations via dashboards 400 on how to increase productivity of the team. The system and methods herein operates by automatically monitoring regular development operations to extract information about development activities and does not require developers to manually classify how they are spending time on each of these activities.

Figure 7:
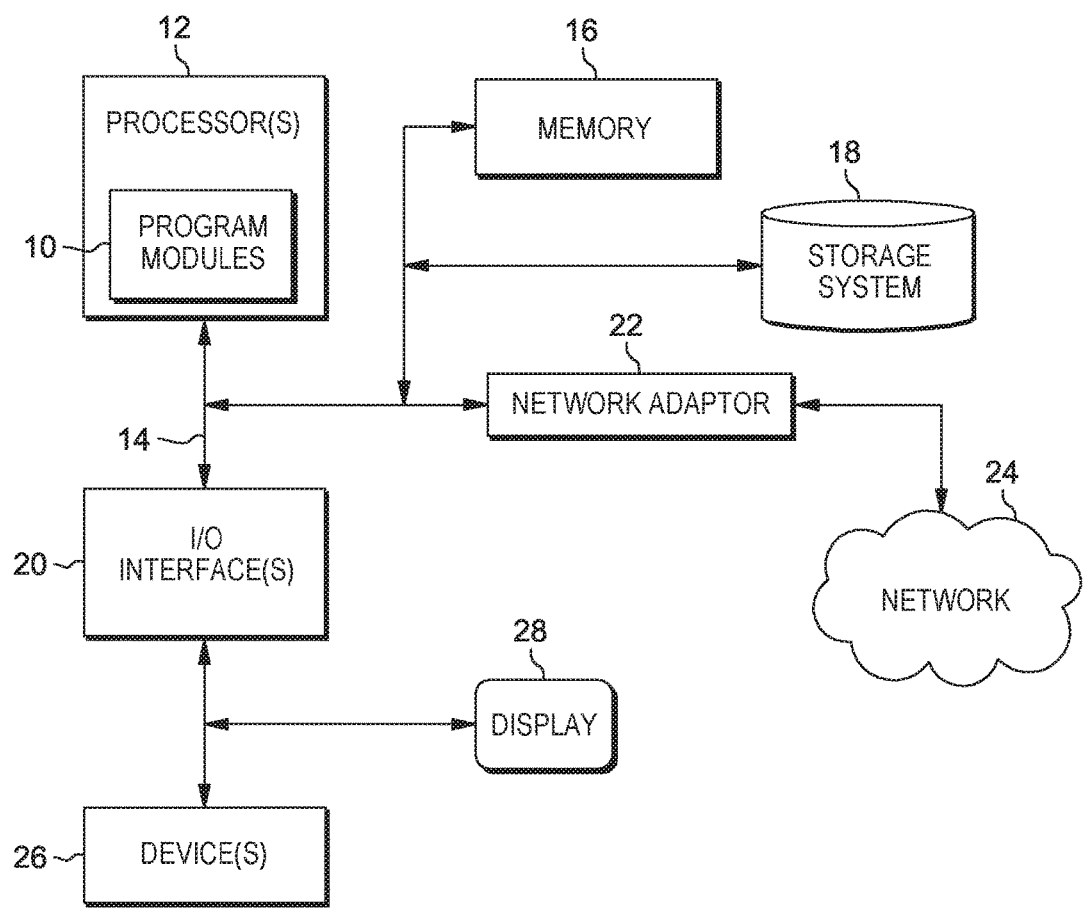
FIG. 7 illustrates an exemplary computing apparatus implementing the methods herein for maximizing developer productivity in accordance with the embodiments of the present invention.

FIG. 7 illustrates an example computing system in accordance with the present invention. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the present invention (see e.g., FIG. 1).

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory an/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for improving the effectiveness and efficiency of software development operations comprising:

for each of a plurality of teams,
receiving, at a hardware processor, current activities data representing each team member's productivity relating to a product currently being developed; and
receiving, at the hardware processor, further current activities data relating to each team member's collaborative interactions; and
performing, at the hardware processor, a cognitive classification of the activities for each of members of each team, and aggregating classifications of team members of each team to generate a respective individual team profile;
generating, at the hardware processor, a respective productivity index function representing desired performance objectives for the team relating to said product currently being developed; and
running a model that is trained using machine learning to determine a most productive team based on historical data comprising individual team profiles, respective said productivity index functions, and product performance data relating to past products developed by respective individual teams;
inputting, using said hardware processor, said generated individual team profile data and corresponding team productivity index function to said trained model, said trained model correlating said individual team profile to learned positive attributes associated with the most productive development team of said plurality of teams; and
generating, using the trained model, an output recommending which performance attributes of an individual team can be improved based on the model's correlating that team's data with the learned positive predicting attributes for increasing productivity of that team.

2. The computer-implemented method as in claim 1, further comprising:
determining, using the trained model, a quantitative relationship between individual member profiles of a respective team, and said desired performance objectives of said productivity index function for the corresponding team; and
providing, based on an analysis of the quantitative relationships, an output indicating one or more key performance indicators to improve and corresponding target improvement values.

3. The computer-implemented method as in claim 1, further comprising:
continuously receiving, at the hardware processor, data relating to further activities of team members of the individual team over time as said product is being developed,
and
using machine learning, at the hardware processor, to train and update, based on received further activities data of individual team members, said model to update individual team profiles for improving said trained model recommendations over time.

4. The computer-implemented method as in claim 1, wherein the performing of cognitive classification of activities comprises:
defining, by the hardware processor, using real-time and/or historical activities data, a job role for said team member according; and
determining, by the hardware processor, each productivity index function as a goal for each team member in that member's defined job role based on a business cycle and competitive market landscape.

5. The computer-implemented method as in claim 1, further comprising:
receiving, at the hardware processor, user defined weights for use in training said model, said weights representing a priority set for a particular business objective or parameter of a product being developed by the team.

6. The computer-implemented method as in claim 1, further comprising:
generating, by the hardware processor, a display for actively monitoring performance progress of said team, over time, based on the performance attributes recommended for the individual team to be improved, said generated display indicating relative performance of a performance attribute as compared to other teams.

7. The computer-implemented method as in claim 1, further comprising:
receiving, at the hardware processor, one or more data selected from a group consisting of: accounting data, human resources data, social collaboration and networking data, software characteristics, and customer service and support data relating to that software being developed; and
determining, using the trained model, said most productive team based on said individual team profiles, said productivity index function, and said one or more accounting data, human resources data, social collaboration and networking data, software characteristics, and customer service and support data relating to that software being developed.

8. The computer-implemented method as in claim 7, wherein said trained model is a multivariate linear model, said method further comprising:
training, by the hardware processor, said multivariate linear model to discover said positive predicting attributes associated with said most productive team; and
indicating, by the hardware processor, which said positive predicting attributes had a greatest impact upon said most productive team.

* * * * *